(12) United States Patent
Hirose (10) Patent No.: US 11,924,389 B2
(45) Date of Patent: Mar. 5, 2024

(54) COMMUNICATION APPARATUS HAVING ENHANCED WIRELESS COMMUNICATION, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Kenichi Hirose, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/122,844

(22) Filed: Mar. 17, 2023

(65) Prior Publication Data

US 2023/0308583 A1 Sep. 28, 2023

(30) Foreign Application Priority Data

Mar. 25, 2022 (JP) ................................ 2022-050453

(51) Int. Cl.
*H04N 1/327* (2006.01)
*H04N 1/00* (2006.01)
*H04W 8/00* (2009.01)

(52) U.S. Cl.
CPC ..... *H04N 1/32765* (2013.01); *H04N 1/00424* (2013.01); *H04N 1/32793* (2013.01); *H04W 8/005* (2013.01); *H04N 2201/0017* (2013.01)

(58) Field of Classification Search
None
See application file for complete search history.

(56) References Cited

U.S. PATENT DOCUMENTS

| 10,448,439 | B2 * | 10/2019 | Ueno | H04W 76/14 |
| 10,785,815 | B2 * | 9/2020 | Ha | H04W 4/80 |
| 2004/0017576 | A1 * | 1/2004 | Nakagawa | H04N 1/2353 |
| | | | | 358/1.15 |

(Continued)

FOREIGN PATENT DOCUMENTS

JP 2018-088572 A 6/2018

*Primary Examiner* — Miya J Cato
*Assistant Examiner* — Pawan Dhingra
(74) *Attorney, Agent, or Firm* — VENABLE LLP (57) ABSTRACT

An information processing apparatus detects a signal transmitted from an external communication apparatus and displays information of the communication apparatus corresponding to the detected signal. If a first signal is detected, a notification screen for prompting a user to perform a specification operation on the communication apparatus is displayed, and if a second signal is detected after displaying the notification screen, when the second signal corresponds to the specification operation, information of the communication apparatus corresponding to the second signal is displayed. If the first signal and the second signal are both detected, a second notification screen for prompting the user to perform a different second specification operation is displayed, and if a third signal is detected after displaying the second notification screen, when the third signal corresponds to the second specification operation, information of the communication apparatus corresponding to the third signal is displayed.

10 Claims, 7 Drawing Sheets

(56) References Cited

U.S. PATENT DOCUMENTS

2012/0033253 A1* 2/2012 Mori .................. G06F 3/1264
358/1.15
2012/0320401 A1* 12/2012 Shibata ................ H04L 63/18
358/1.14
2018/0152973 A1* 5/2018 Ueno .................. H04W 76/11

* cited by examiner

COMMUNICATION APPARATUS HAVING ENHANCED WIRELESS COMMUNICATION, CONTROL METHOD, AND NON-TRANSITORY COMPUTER-READABLE STORAGE MEDIUM STORING PROGRAM

BACKGROUND OF THE INVENTION

Field of the Invention

The present invention relates to a communication apparatus communicable with an access point, a control method, and a non-transitory computer-readable storage medium storing a program.

Description of the Related Art

To perform communication between an information processing apparatus (to be referred to as a PC hereinafter) and a wireless terminal apparatus (to be referred to as a device hereinafter), there is known a technique of establishing infrastructure connection by connecting the PC and the device to an access point (to be referred to as an AP hereinafter). Note that the information processing apparatus includes a smartphone in addition to the PC.

Japanese Patent Laid-Open No. 2018-88572 discloses a technique of connecting a device to an AP by temporarily establishing wireless connection between a PC and the device and transmitting, from the PC to the device, connection information used by the device to be connected to the AP. Furthermore, Japanese Patent Laid-Open No. 2018-88572 discloses a technique in which a character string of an SSID issued by the device is changed by the device and the PC specifies the device with the changed SSID in a method of detecting a device that is temporarily, wirelessly connected.

SUMMARY OF THE INVENTION

The present invention provides a mechanism of improving convenience when connecting an information processing apparatus and a communication apparatus.

The present invention in one aspect provides a method including: detecting a signal transmitted from an external communication apparatus; and displaying, based on the detected signal, information of the communication apparatus corresponding to the signal on a display unit of an information processing apparatus, wherein if a first signal is detected, a notification screen for prompting a user to perform a specification operation on a communication apparatus is displayed on the display unit, and if a second signal is detected after displaying the notification screen on the display unit, in a case in which the second signal corresponds to the specification operation, information of the communication apparatus corresponding to the second signal is displayed on the display unit.

According to the present invention, it is possible to improve convenience when connecting an information processing apparatus and a communication apparatus.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Identification information included in an SSID and unique to a communication apparatus is often an enumeration of characters, alphanumerics, or the like, and it is difficult for a user to recognize whether the communication apparatus is a communication apparatus to which connection is desired.

According to the present disclosure, it is possible to improve convenience when connecting an information processing apparatus and a communication apparatus.

First Embodiment

An information processing apparatus 101 and a communication apparatus 151 included in a communication system according to this embodiment will be described. In this embodiment, a smartphone is exemplified as the information processing apparatus 101 but the present invention is not limited to this. For example, as the information processing apparatus 101, various kinds of apparatuses such as a portable terminal, a Personal Computer (PC), a tablet terminal, a Personal Digital Assistant (PDA), and a digital camera are applicable. A printer is exemplified as the communication apparatus 151 but the present invention is not limited to this, and various kinds of apparatuses are applicable as long as they can perform wireless communication with the information processing apparatus 101. For example, concerning a printer, an inkjet printer, a full-color laser beam printer, a monochrome printer, and the like are applicable. Furthermore, not only a printer but also a copying machine, a facsimile apparatus, a portable terminal, a smartphone, a laptop, a tablet terminal, a PDA, a digital camera, a music playback device, a television, a smart speaker, and the like are applicable. In addition, a multi-function peripheral having a plurality of functions such as a copying function, a FAX function, and a print function is applicable.

First, components of the information processing apparatus 101 of this embodiment and the communication apparatus 151 communicable with the information processing apparatus 101 of this embodiment will be described with reference to a block diagram shown in FIG. 1. Although this embodiment will exemplify the following components, the present invention is not limited to functions shown in FIG. 1. Components corresponding to functions executable by apparatuses that are applicable as apparatuses communicable with each other are appropriately provided.

The information processing apparatus 101 includes an input interface 102, a CPU 103, a ROM 104, a RAM 105, an external storage device 106, an output interface 107, a display unit 108, a communication unit 110, and a short distance wireless communication unit 111. The CPU 103, the ROM 104, the RAM 105, and the like form a computer of the information processing apparatus 101 for executing a program.

The input interface 102 is an interface for accepting data input and operation instructions from the user when an operation unit such as a keyboard 109 is operated. Note that the operation unit may include a physical keyboard and physical buttons, or may include a software keyboard and software buttons displayed on the display unit 108. That is, the input interface 102 may accept input from the user via the display unit 108.

The CPU 103 is a system control unit and controls the whole information processing apparatus 101. The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by a Static Random Access Memory (SRAM) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores an application program (to be referred to as a setting application) configured to perform a network setup of the communication apparatus 151, a print information generation program that generates print information interpretable by the printing apparatus 151, and the like. The setting application is, for example, an application program for setting an access point as the connection destination of the communication apparatus 151 by Wi-Fi Easy Connect® (WEC) or the like. Note that the setting application may have functions other than the network setup function. For example, the setting application may have a function of causing the communication apparatus 151 to execute printing, a function of scanning a document set on a document table (not shown) of the communication apparatus 151, a function of confirming the state of the communication apparatus 151, and the like. The setting application is stored in the external storage device 106 by being installed from an external server by, for example, Internet communication via the communication unit 110. Furthermore, the external storage device 106 stores various kinds of programs such as an information transmission/reception control program to be transmitted/received to/from the communication apparatus 151 connected via the communication unit 110, and various kinds of information to be used by the programs. The external storage device 106 stores a set of a character string and a specification operation performed by the user for the communication apparatus 151, which are associated with each other. The specification operation will be described later. A plurality of sets may be stored. Note that contents stored in the external storage device 106 are the same as a set of a character string and a specification operation stored in the communication apparatus 151 (to be described later).

The output interface 107 is an interface configured to perform display control for causing the display unit 108 to display data or make a notification concerning the state of the information processing apparatus 101. The display unit 108 is formed by a Light-Emitting Diode (LED), a Liquid Crystal Display (LCD), or the like and displays data or makes a notification concerning the state of the information processing apparatus 101. An image capturing unit 112 is, for example, a camera that captures the outside.

The communication unit 110 is a component connected to the apparatus such as the communication apparatus 151 or an access point 131 to execute data communication. For example, the communication unit 110 can be connected to an access point (not shown) in the communication apparatus 151. If the communication unit 110 and the access point in the communication apparatus 151 are connected, the information processing apparatus 101 and the communication apparatus 151 can communicate with each other. Note that the communication unit 110 may directly communicate with the communication apparatus 151 by wireless communication, or may perform communication via an external apparatus existing outside the information processing apparatus 101 and the communication apparatus 151. Note that examples of the external apparatus include an external access point (the access point 131 or the like) existing outside the information processing apparatus 101 and the communication apparatus 151, and an apparatus, other than the access point, that can relay communication. In this embodiment, as a wireless communication method used by the communication unit 110, Wireless Fidelity (Wi-Fi)® which is a communication standard based on the IEEE802.11 series is used. WEC described above can be executed by communication by the communication unit 110. In addition, for example, a device such as a wireless LAN router is used as the access point 131. Note that in this embodiment, the method of directly connecting the information processing apparatus 101 and the communication apparatus 151 without intervention of an external access point is called a direct connection method. In addition, the method of connecting the information processing apparatus 101 and the communication apparatus 151 via the external access point is called an infrastructure connection method.

The short distance wireless communication unit 111 is a component wirelessly connected to the apparatus such as the communication apparatus 151 in a short distance to execute data communication, and performs communication by a communication method different from that of the communication unit 110. The short distance wireless communication unit 111 can be connected to a short distance wireless communication unit 157 in the communication apparatus 151. As the communication method, for example, Near Field Communication (NFC), Bluetooth® Classic, Bluetooth Low Energy (BLE), a Wi-Fi Aware, or the like is used.

The communication apparatus 151 serves as the communication apparatus of this embodiment. The communication apparatus 151 includes a ROM 152, a RAM 153, a CPU 154, a print engine 155, a communication unit 156, and the short distance wireless communication unit 157. The ROM 152, the RAM 153, the CPU 154, and the like form a computer of the communication apparatus 151 for executing a program.

The communication unit 156 includes, as the access point in the communication apparatus 151, an access point for connection to the external apparatus such as the information processing apparatus 101. Note that the access point can be connected to the communication unit 110 of the information processing apparatus 101. If the communication unit 156 enables the access point, the communication apparatus 151 operates as the access point. Note that the communication unit 156 may directly, wirelessly be connected to the information processing apparatus 101 or may wirelessly be connected to the information processing apparatus 101 via the access point 131. In this embodiment, as the wireless communication method used by the communication unit 156, a communication standard based on the IEEE802.11 series is used. If the communication apparatus 151 supports WEC, WEC describe above is executed by communication by the communication unit 156. The communication unit 156 may include a hardware component functioning as an access point or may operate as an access point by software for functioning as an access point.

The communication apparatus 151 of this embodiment can operate in an infrastructure mode or a Peer-To-Peer (P2P) mode as a mode for performing communication using the communication unit 156.

The infrastructure mode is a mode in which the communication apparatus 151 communicates with another apparatus such as the information processing apparatus 101 via an external apparatus (for example, the access point 131) forming a network. Connection to the external access point, which is established by the communication apparatus 151 operating in the infrastructure mode, is called infrastructure connection hereinafter. In this embodiment, in the infrastructure connection, the communication apparatus 151 operates as a station and the external access point operates as a master. Note that in this embodiment, the master is an apparatus that decides a communication channel used in a network to which the master belongs, and the station is an apparatus that does not decide a communication channel used in a network to which the station belongs, and uses the communication channel decided by the master.

The P2P mode is a mode in which the communication apparatus 151 directly communicates with another apparatus such as the information processing apparatus 101 without intervention of an external apparatus forming a network. In this embodiment, the P2P mode includes an AP mode in which the communication apparatus 151 operates as an access point. In the AP mode, connection information (SSID and password) of the access point enabled in the communication apparatus 151 can arbitrarily be set by the user. Note that the P2P mode may include, for example, a WFD mode in which the communication apparatus 151 performs communication by Wi-Fi Direct (WFD). Note that which of a plurality of WFD-capable apparatuses operates as a master is decided in accordance with, for example, the Group Owner Negotiation procedure. The master may be decided without executing the Group Owner Negotiation procedure. An apparatus that is a WFD-capable apparatus and serves as a master is especially called a Group Owner. Direct connection to another apparatus, which is established by the communication apparatus 151 operating in the P2P mode, is called direct connection. In the direct connection, for example, the communication apparatus 151 operates as a master and the other apparatus operates as a station.

Furthermore, in this embodiment, the communication apparatus 151 can operate in a network setup mode as a mode of executing a network setup of the communication apparatus 151 by a predetermined communication protocol (setup communication protocol) by accepting a predetermined operation from the user. If the communication apparatus 151 operates in the network setup mode, it uses the communication unit 156 to operate as a setup access point which is enabled during the operation in the network setup mode. The setup access point is an access point different from an access point enabled in the above-described AP mode. Furthermore, the SSID of the setup access point includes a predetermined character string that can be recognized by the setting application of the information processing apparatus 101. The setup access point is an access point that does not require a password for connection. The communication apparatus 151 operating in the network setup mode uses the setup communication protocol in communication with the information processing apparatus 101 connected to the setup access point. More specifically, the setup communication protocol is, for example, Simple Network Management Protocol (SNMP) or Device Provisioning Protocol (DPP). If a time-out time for the network setup mode elapses after the start of the operation in the network setup mode, the communication apparatus 151 stops the operation in the network setup mode, and disables the setup access point. This is because the setup access point is an access point that does not require a password, as described above, and thus if the access point is enabled for a long time, an inappropriate apparatus highly probably requests connection. Note that the setup access point may be an access point that requires a password. In this case, a password used for connection to the setup access point is a fixed password (unchangeable by the user) that is grasped in advance by the setting application.

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154, and functions as a reception buffer configured to temporarily store print information received from the information processing apparatus 101 or the like, or stores various kinds of information.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152. The CPU 154 is a system control unit and controls the whole communication apparatus 151. The ROM 152 stores a set of a character string and a specification operation performed by the user for the communication apparatus 151, which are associated with each other. The specification operation will be described later. A plurality of sets may be stored. Note that contents stored in the ROM 152 are the same as the set of the character string and the specification operation stored in the information processing apparatus 101.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is required to use, for communication of the print job, a communication method that allows high-speed communication. Therefore, the communication apparatus 151 receives the print job via the communication unit 156 that can perform communication at a speed higher than that of the short distance wireless communication unit 157. A display unit 158 is, for example, a panel, and displays data or makes a notification concerning the state of the communication apparatus 151.

Note that a memory such as an external HDD or an SD card may be attached as an optional device to the communication apparatus 151, and information stored in the communication apparatus 151 may be stored in the memory.

In this embodiment, the communication units 110 and 156 execute communication parameter sharing processing for sharing communication parameters between the apparatuses. The communication parameter sharing processing is processing in which a providing-side apparatus provides communication parameters for wireless communication to a reception-side apparatus, and can be performed in each of the infrastructure mode and the P2P mode. In this case, the communication parameters include, for example, wireless communication parameters necessary for wireless LAN communication, such as a Service Set Identifier (SSID) as a network identifier, an encryption method, an encryption key, an authentication method, and an authentication key. The communication parameters also include identification information such as a MAC address, a password, an IP address for communication on the IP layer, and information necessary for higher level services. The communication parameter sharing processing executed by the communication units 110 and 156 may be, for example, Wi-Fi Protected Setup (WPS) defined by the Wi-Fi alliance. In the communication parameter sharing processing executed by the communication units 110 and 156, a method of safely transferring the communication parameters using public-key cryptography may be used.

Figure 1:
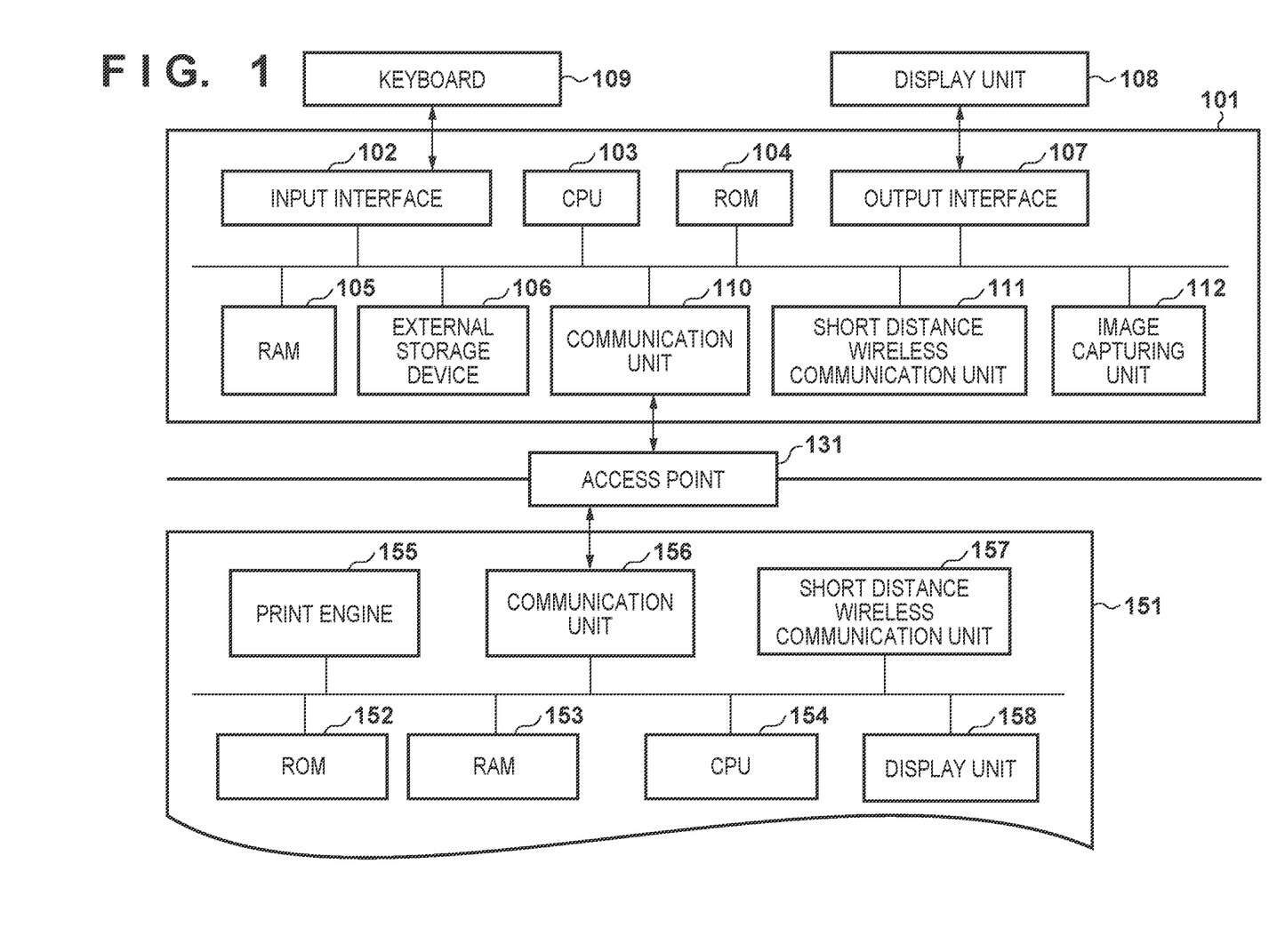
FIG. 1 is a block diagram showing components of an information processing apparatus and a communication apparatus.

The components of the information processing apparatus 101 are not limited to those shown in FIG. 1, and may include other components. For example, the information processing apparatus 101 may further include a barcode reading control unit. For example, the barcode reading control unit analyzes an image captured by the image capturing unit 112 as a camera, and acquires encoded code information. The barcode reading control unit executes analysis processing of code information such as a barcode, a two-dimensional code, or a QR Code®.

The components of the communication apparatus 151 are not limited to those shown in FIG. 1, and may include other components. For example, the communication apparatus 151 may further include a barcode generation control unit. The barcode generation control unit is implemented when, for example, the CPU 154 executes a program. The barcode generation control unit generates code information such as a barcode, a two-dimensional code, or a QR Code®, and executes control to display the generated code information on the display unit 158. The barcode generation control unit displays, on the display unit 158, a QR code or the like obtained by encoding information necessary to set the communication parameters. Note that the display unit 158 may be a component capable of displaying software buttons and the like as an input interface of the user.

Figure 2A:
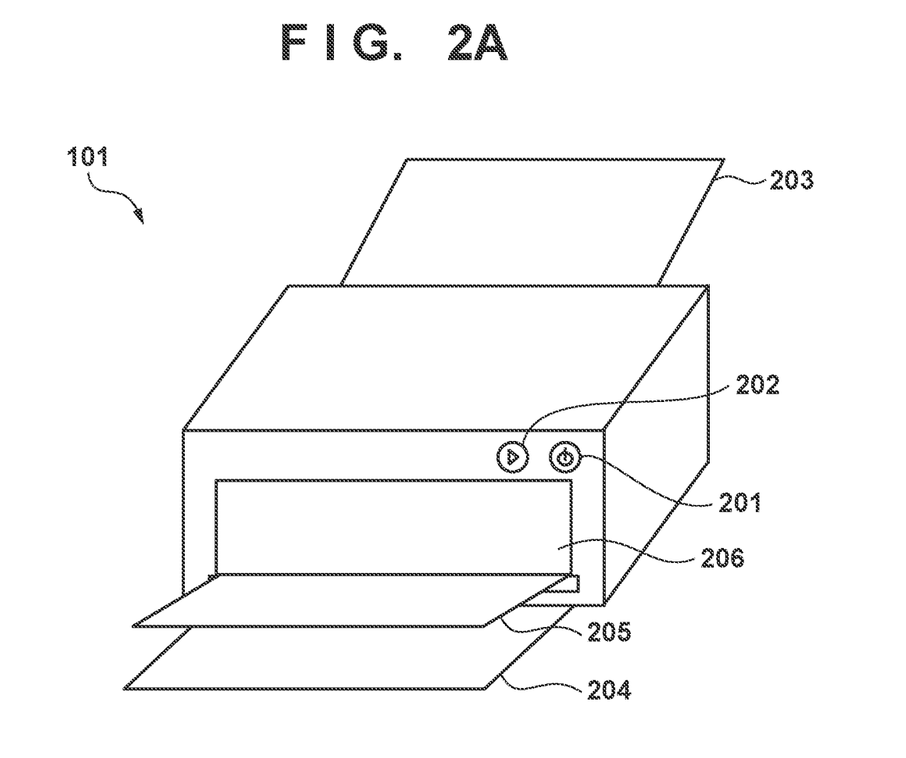
FIGS. 2A and 2B are views each showing the outline of the outer appearance of a printing apparatus.
Figure 2B:
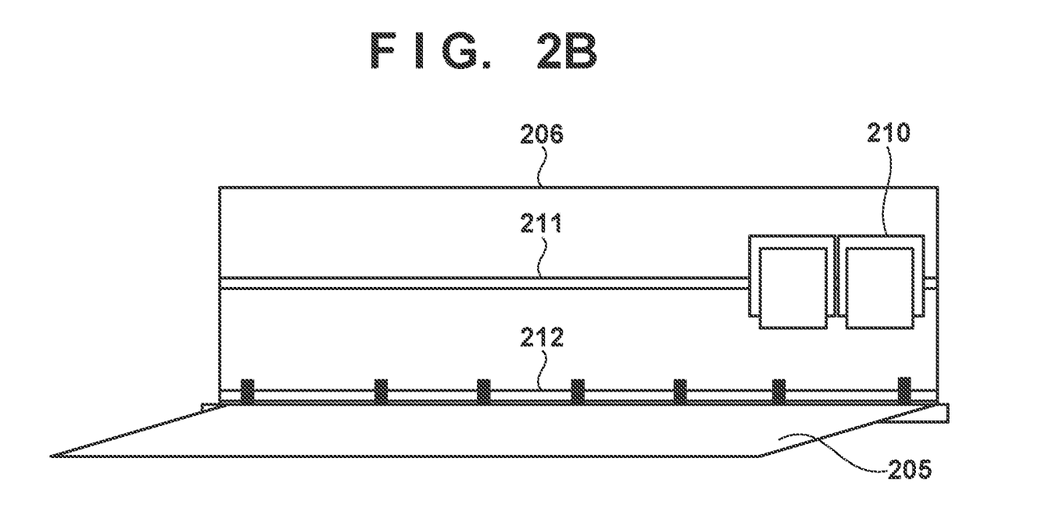
Figure 3A:
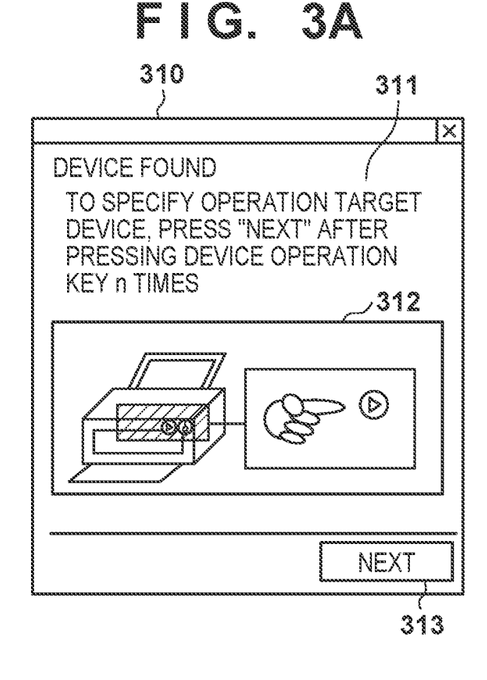
FIGS. 3A to 3D are views each showing a user interface screen.
Figure 3B:
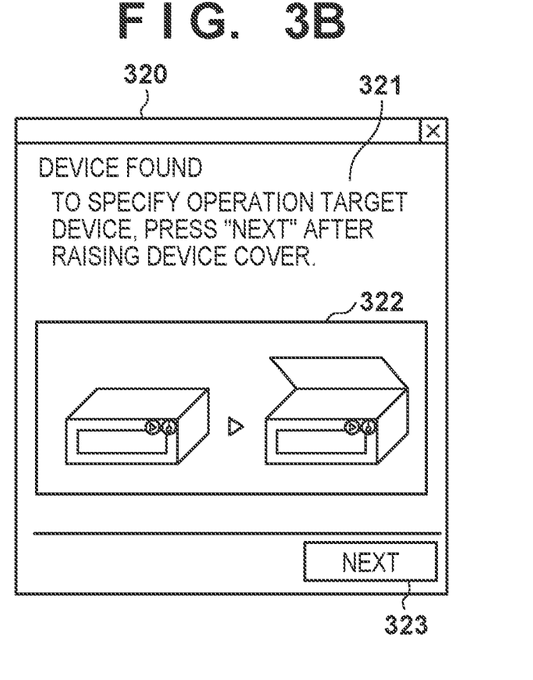
Figure 3C:
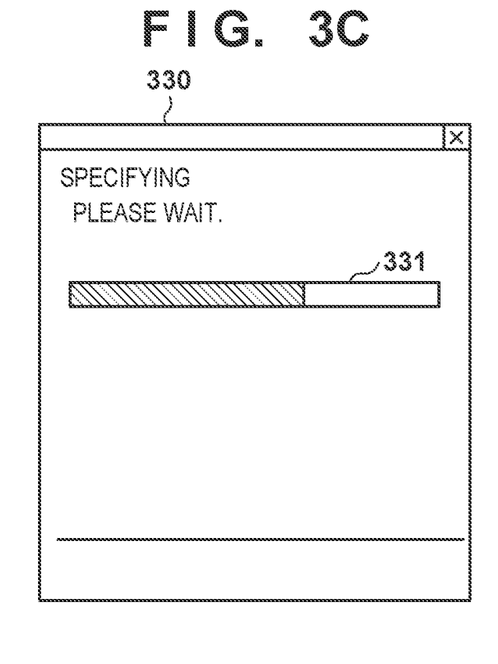
Figure 3D:
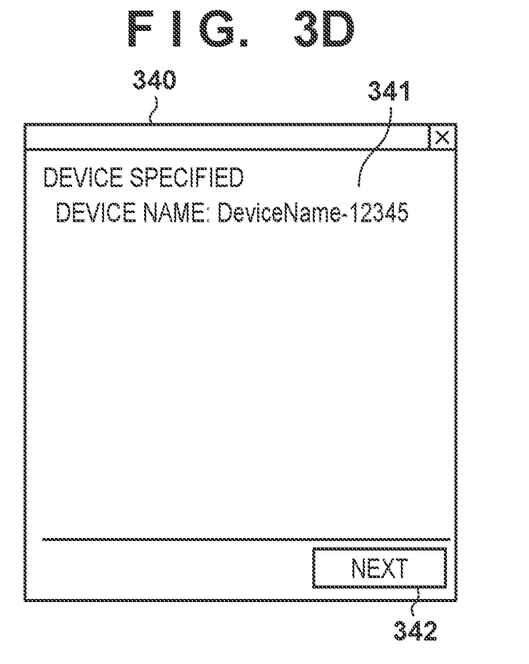

FIGS. 2A and 2B are views each showing the outline of the components of the communication apparatus 151. FIG. 2A shows the outer appearance of the communication apparatus 151. The communication apparatus 151 includes a power button 201, an operation button 202, a paper feed tray 203, a discharge tray 204, an access cover 205, and a cover sensor (not shown). FIG. 2B shows a state in which the access cover 205 shown in FIG. 2A is in an open state. An opening portion 206 shown in FIG. 2B is configured to appear when the access cover 205 is opened.

FIG. 2B shows the outline of the internal components of the opening portion 206 shown in FIG. 2A. An ink holder 210 is configured to hold ink tanks (ink cartridges) (not shown) and reciprocally move along a shaft 211 in the left-and-right direction in FIG. 2B. The ink tanks store, for example, cyan, magenta, yellow, and black inks, and the color inks are discharged, to a printing paper sheet, from nozzles of a printhead (not shown) in which the ink tanks are mounted. The printing paper sheet is fed by a paper feed roller 212.

To perform communication such as transmission of a print job with the communication apparatus 151, the information processing apparatus 101 performs infrastructure connection via the access point 131. At this time, the information processing apparatus 101 has already been connected to the access point 131, and the communication apparatus 151 is not connected to the access point 131. To perform connection to the access point 131, the communication apparatus 151 needs connection information of the access point 131. Therefore, the communication apparatus 151 operates as an access point to be temporarily, wirelessly connected to the information processing apparatus 101. Then, the information processing apparatus 101 transmits the connection information of the access point 131 to the communication apparatus 151. Upon receiving the connection information of the access point 131, the communication apparatus 151 is connected to the access point 131.

In order for the communication apparatus 151 to perform temporary wireless connection to the information processing apparatus 101, the information processing apparatus 101 needs to acquire a beacon transmitted by a peripheral device, and specify a connection target device based on information included in the beacon. Depending on the Operating System (OS) of a PC or a smartphone, only the SSID of the information included in the beacon may be acquired due to OS restrictions. Therefore, as a method of specifying a device by the information processing apparatus 101, the connection target device is specified only based on the character string information included in the SSID.

For example, on an application screen displayed on the smartphone, the user is notified of an SSID detected by the smartphone, and then specifies a connection target device. If the user specifies the connection target device only based on character string information included in the SSID, the SSID needs to include character string information such as a product model number or a model name for specifying a model. However, the user can specify only the model of the device based on the model name or the product model number. If there exist a plurality of devices of the same model, the user cannot specify the connection target device. To solve this problem, by including, in the SSID, identification information such as a serial number uniquely determined for an individual product, it is possible to distinguish each device even if there exist devices of the same model. However, the identification information uniquely determined for an individual product is an enumeration of alphanumerics or a long complex character string, and thus the user can visually recognize it but it is difficult to remember it.

Therefore, it is difficult for the user to specify the connection target device based on the identification information included in the SSID and uniquely determined for an individual product. In addition, since the housing of the product is small or the management load is put on production of the product, the identification information uniquely determined for an individual product is not often described on the exterior of the product or its enclosure.

As described above, it is assumed that it is difficult for the user to know the identification information uniquely determined for an individual product. Therefore, it is difficult for the user to specify the connection target device only based on the character string information included in the SSID.

Therefore, in this embodiment, to specify the communication apparatus 151 for performing temporary wireless connection, the information processing apparatus 101 displays, on the display unit 108, a screen for prompting the user to perform a specification operation on the communication apparatus 151. After the user performs the specification operation, the communication apparatus 151 changes the SSID by adding information of the specification operation to the SSID. Then, the information processing apparatus 101 detects the changed SSID, and specifies the connection target communication apparatus 151.

Figure 4A:
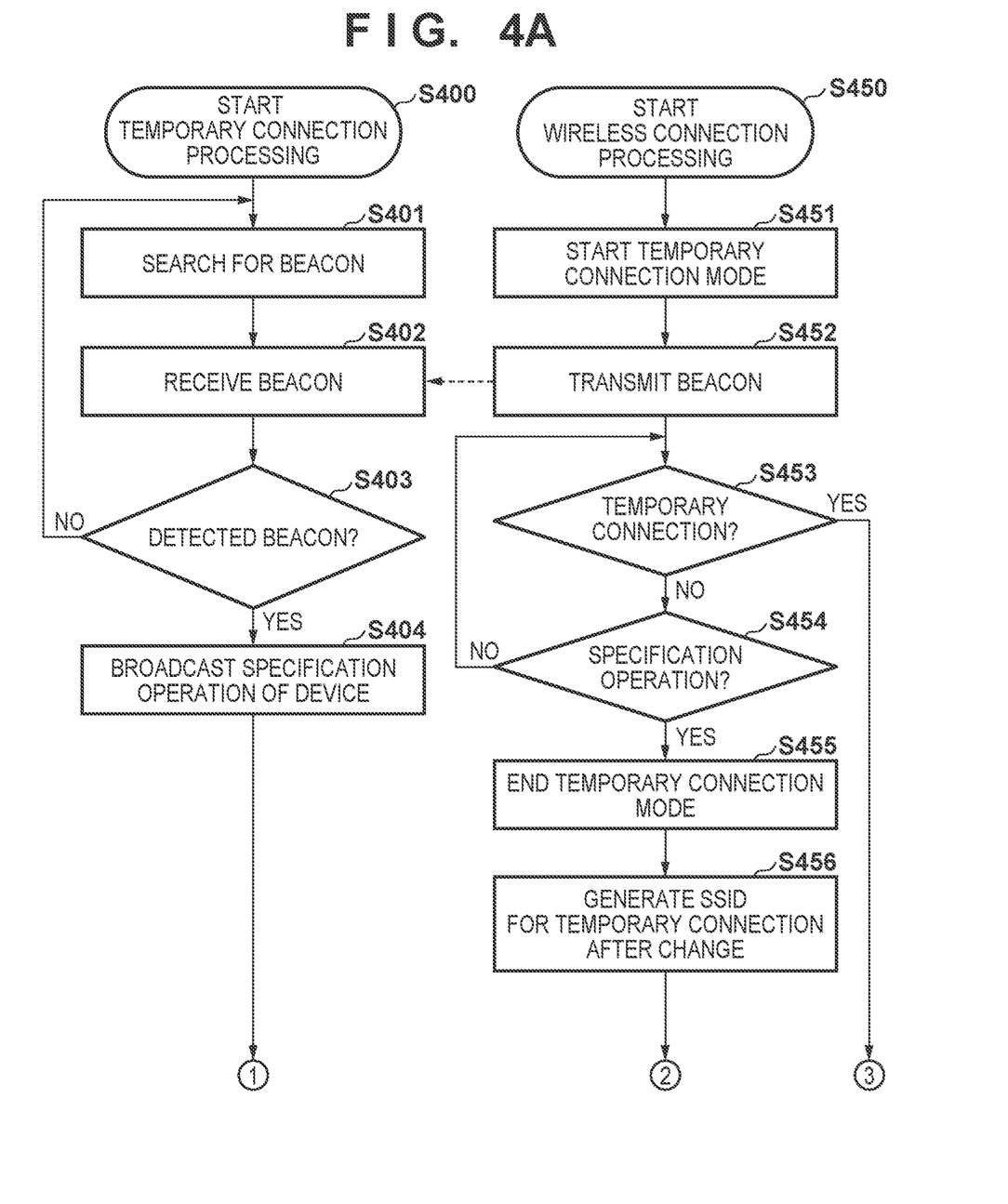
FIGS. 4A to 4B are flowcharts illustrating processes executed by the information processing apparatus and the communication apparatus.
Figure 4B:
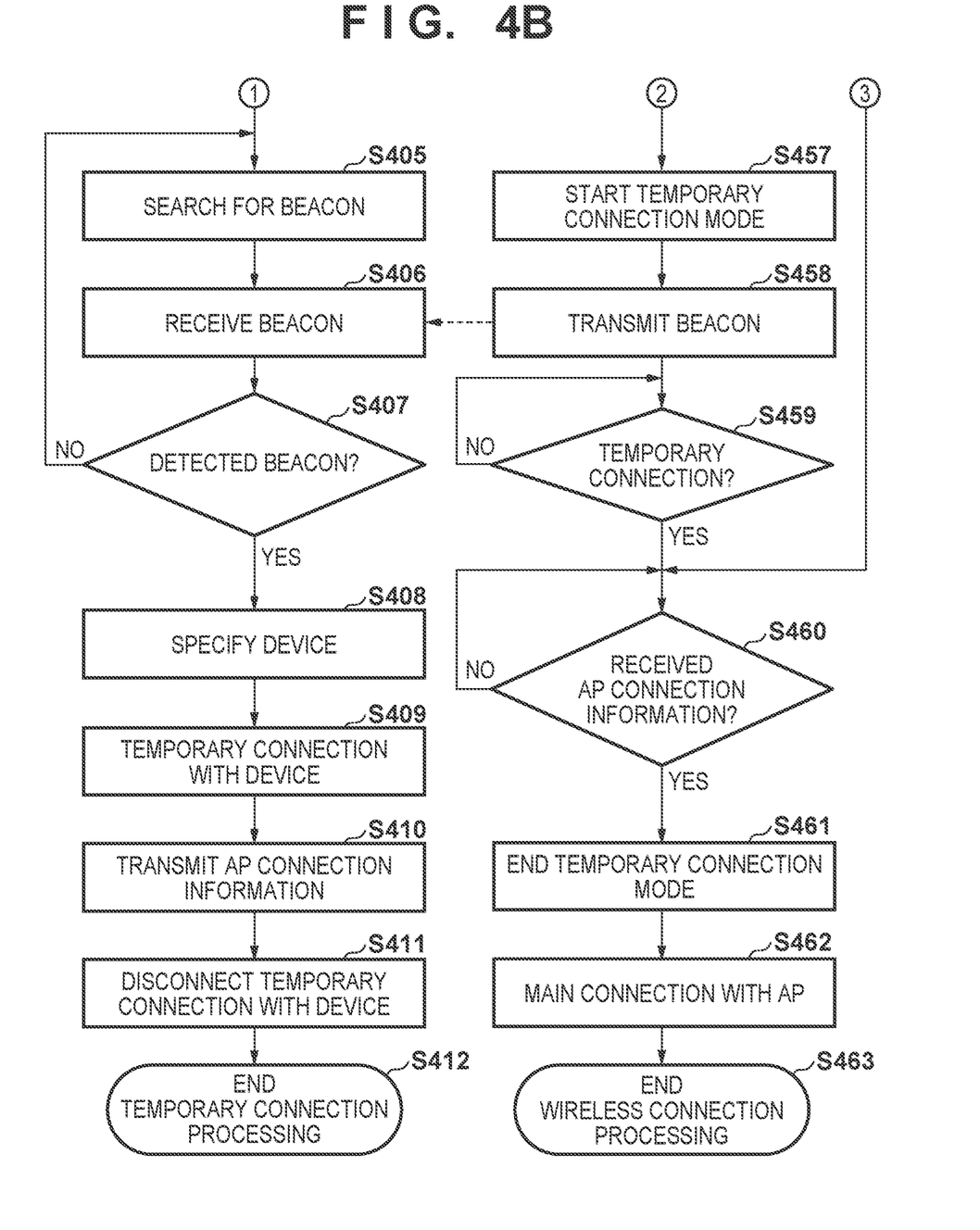

FIGS. 3A to 3D are views each showing a screen displayed by the setup application on the display unit 108 of the information processing apparatus 101. FIGS. 4A to 4B are flowcharts illustrating processing in which the information processing apparatus 101 specifies the connection target communication apparatus 151. With the processing shown in FIGS. 4A to 4B, the user operates the connection target communication apparatus 151 in accordance with an instruction of which the information processing apparatus 101 notifies the user, and the information processing apparatus 101 specifies the communication apparatus 151 corresponding to the changed SSID. The processing of the information processing apparatus 101 in FIGS. 4A to 4B is implemented when, for example, the CPU 103 reads out the program stored in the ROM 104 and executes it. The processing of the communication apparatus 151 in FIGS. 4A to 4B is implemented when, for example, the CPU 154 reads out the program stored in the ROM 152 and executes it.

In the information processing apparatus 101, if the setup application starts a setup for the communication apparatus 151 to be connected to the access point 131, the processing of the information processing apparatus 101 in FIGS. 4A to 4B is started (step S400). If the processing is started, the information processing apparatus 101 searches for a beacon (step S401), and receives a beacon transmitted on the periphery of the information processing apparatus 101 (step S402). On the other hand, in the communication apparatus 151, if a predetermined operation for causing the communication apparatus 151 to operate as an access point is performed, the processing of the communication apparatus 151 in FIGS. 4A to 4B is started (step S450). The predetermined operation for causing the communication apparatus 151 to operate as an access point is, for example, a predetermined operation for causing the above-described communication apparatus 151 to operate in the network setup mode.

Upon accepting the predetermined operation, the communication apparatus 151 is set in a mode (to be referred to as a temporary connection mode hereinafter) for temporary connection (step S451), as described above, and transmits a beacon (signal) indicating an SSID (to be referred to as a temporary connection SSID hereinafter) for temporary connection (step S452). If the information processing apparatus 101 exists on the periphery of the communication apparatus 151, this beacon is received by the information processing apparatus 101 in step S402. In this embodiment, the temporary connection SSID is formed by a character string for a Wi-Fi setup, a product name character string, and an identification information character string uniquely determined for an individual product in this order. For example, the temporary connection SSID is formed by "WifiSetup-DeviceName-12345". In this case, "WifiSetup" is the character string for the Wi-Fi setup, "DeviceName" is the product name character string, and "12345" is the identification information character string uniquely determined for the individual product. After that, the communication apparatus 151 determines whether it is connected to one information processing apparatus 101 in the temporary connection mode (step S453). Whether the communication apparatus 151 is connected to one information processing apparatus 101 is determined based on, for example, the start of communication for receiving connection information of an access point. Communication for receiving the connection information is, for example, communication using Device Provisioning Protocol (DPP). In this case, for example, if a network setup request by DPP is received from the information processing apparatus 101, it may be determined that the communication apparatus 151 is connected to the information processing apparatus 101.

If it is determined in step S453 that the communication apparatus 151 is connected to one information processing apparatus 101, the communication apparatus 151 stands by for reception of the connection information of the access point 131 to be connected to the access point 131 (step S460). On the other hand, if it is determined in step S453 that the communication apparatus 151 is not connected to any information processing apparatus 101, the communication apparatus 151 stands by for acceptance of a specific user operation (to be referred to as a specification operation hereinafter) for the communication apparatus 151, which is stored in the information processing apparatus 101 and the communication apparatus 151 in common (step S454). The specification operation is a user operation performed on the communication apparatus 151, and is stored in advance in the information processing apparatus 101 and the communication apparatus 151 in common. Examples of the specification operation are pressing of the operation button 202 of the communication apparatus 151 a plurality of times, the opening/closing operation of the access cover 205 of the communication apparatus 151, and feeding of paper to the paper feed tray 203 of the communication apparatus 151. For example, if a predetermined time elapses according to a timer, it is determined in step S454 that no specification operation is performed. If it is determined in step S454 that no specification operation is performed, the processing is repeated from step S453.

On the other hand, based on the SSID received in steps S401 and S402, the information processing apparatus 101 determines whether the beacon including the temporary connection SSID is detected (step S403). For example, since the SSID included in the received beacon is formed by character strings of the character string for the Wi-Fi setup, the product name character string, and the identification information character string uniquely determined for the individual product, the information processing apparatus 101 determines that the beacon including the temporary connection SSID is detected. If it is determined in step S403 that the beacon including the temporary connection SSID is not detected, the processing is repeated from step S401. On the other hand, if it is determined in step S403 that the beacon including the temporary connection SSID is detected, the information processing apparatus 101 notifies the user to perform the specification operation on the connection target communication apparatus 151 (step S404). For example, if the specification operation is "pressing the button a plurality of times", the information processing apparatus 101 displays, on the display unit 108, a notification screen 310 shown in FIG. 3A. The notification screen 310 includes a text 311 for prompting the user to press the operation button 202 a plurality of times with respect to the connection target communication apparatus 151. The notification screen 310 includes an image 312 indicating the position of the operation button 202 of the communication apparatus 151. If the user presses a "next" button 313 on the notification screen 310, the information processing apparatus 101 displays, on the display unit 108, a search screen 330 shown in FIG. 3C. For example, if the specification operation is "the opening of the cover", the information processing apparatus 101 displays, on the display unit 108, a notification screen 320 shown in FIG. 3B. The notification screen 320 includes a text 321 for prompting the user to open the cover with respect to the connection target communication apparatus 151. The notification screen 320 includes an image 322 indicating opening of the access cover 205 of the communication apparatus 151. If the user presses a "next" button 323 on the notification screen 320, the information processing apparatus 101 displays, on the display unit 108, the search screen 330 shown in FIG. 3C. The search screen 330 includes a progress bar 331 indicating the progress of the search processing. Note that if it is determined that a plurality of beacons each including a temporary connection SSID are detected, the process advances to step S404. If it is determined that only one beacon including a temporary connection SSID is detected, the process may advance to not step S404 but step S408, and the communication apparatus 151 that transmits the one detected beacon including the SSID may be specified as the connection target communication apparatus 151.

On the other hand, in the communication apparatus 151, if it is determined in step S454 that the specification operation is performed, the communication apparatus 151 ends the temporary connection mode (step S455). In step S455, for example, the communication apparatus 151 stops the transmission of the beacon signal.

Then, the communication apparatus 151 generates a temporary connection SSID (to be referred to as a changed temporary connection SSID hereinafter) obtained by adding the operation information character string of the specification operation to the end of the temporary connection SSID (step S456). The operation information character string of the specification operation is a character string of the form stored in advance in the information processing apparatus 101 and the communication apparatus 151 in common. For example, the information processing apparatus 101 and the communication apparatus 151 store "-B" as the operation information character string of "the pressing of the button", and stores "the number of times of the pressing" as a subsequent numeric string. For example, if the specification operation is "three times of the pressing of the button", "-B3" is stored as the operation information character string of the specification operation. Furthermore, for example, the information processing apparatus 101 and the communication apparatus 151 store "-CO" as the operation information character string of "the opening of the cover". For example, if the specification operation is "the opening of the cover", "-CO" is stored as the operation information character string of the specification operation. The changed temporary connection SSID is formed by the temporary connection SSID and the operation information character string of the specification operation. In the changed temporary connection SSID, a portion of the character string of the temporary connection SSID remains the same, and the operation information character string of the specification operation is added to the end of the temporary connection SSID. Assume, for example, that the temporary connection SSID is "WifiSetup-DeviceName-12345", and the operation information character string of the specification operation is "-B3". In this case, the changed temporary connection SSID is "WifiSetup-DeviceName-12345-B3".

After the changed temporary connection SSID is generated, the communication apparatus 151 is set again in the temporary connection mode (step S457), and transmits, to the periphery, a beacon (signal) indicating the changed temporary connection SSID generated in step S456 (step S458). The communication apparatus 151 determines whether it is connected to one information processing apparatus 101 in the temporary connection mode (step S459). This determination processing is performed based on the start of communication for receiving connection information of an access point, similar to step S453. The processing in step S459 is repeated until it is determined that the communication apparatus 151 is connected to one information processing apparatus 101.

On the other hand, the information processing apparatus 101 displays the search screen 330 on the display unit 108 to search for a beacon (step S405), and receives a beacon transmitted on the periphery of the information processing apparatus 101 (step S406). Based on the SSID included in the beacon received in steps S405 and S406, the information processing apparatus 101 determines whether the beacon including the changed temporary connection SSID is detected (step S407). For example, since the SSID included in the received beacon is formed by the character string for the Wi-Fi setup, the product name character string, the identification information character string uniquely determined for the individual product, and the operation information character string of the specification operation, the information processing apparatus 101 determines that the beacon including the changed temporary connection SSID is detected. If it is determined in step S407 that the beacon including the changed temporary connection SSID is not detected, the processing is repeated from step S405.

On the other hand, if it is determined in step S407 that the beacon including the changed temporary connection SSID is detected, the information processing apparatus 101 specifies, as the connection target communication apparatus 151, the communication apparatus 151 that transmits the beacon including the changed temporary connection SSID (step S408). In step S408, the information processing apparatus 101 displays, on the display unit 108, a result screen 340 shown in FIG. 3D. The result screen 340 includes a device information character string 341 as a character string for identifying the specified communication apparatus 151. If the user presses a "next" button 342 on the result screen 340, the information processing apparatus 101 is connected to the communication apparatus 151 using the changed temporary connection SSID transmitted by the communication apparatus 151 (step S409). In step S409, for example, a network setup request by DPP is transmitted to the communication apparatus 151. The information processing apparatus 101 transmits the connection information of the access point 131 to the connected communication apparatus 151 (step S410), and then disconnects the connection from the communication apparatus 151 (step S411). After step S411, the processing of the information processing apparatus 101 ends (step S412).

On the other hand, in the communication apparatus 151, if it is determined in step S459 that the communication apparatus 151 is connected to one information processing apparatus 101, the communication apparatus 151 stands by for reception of the connection information of the access point 131 to be connected to the access point 131 (step S460). The processing in step S460 is repeated until the connection information of the access point 131 is received. Upon receiving the connection information of the access point 131 from the information processing apparatus 101 connected in step S460, the communication apparatus 151 ends the temporary connection mode (step S461). Then, the communication apparatus 151 is connected to the access point 131 using the received connection information of the access point 131 (step S462). After step S462, the processing of the communication apparatus 151 ends (step S463).

As described above, in this embodiment, to specify the communication apparatus 151 to which the information processing apparatus 101 is temporarily, wirelessly connected, the user is notified to perform the specification operation on the connection target communication apparatus 151. Then, by performing the specification operation, the communication apparatus 151 corresponding to the SSID whose contents have been changed is specified as the connection target communication apparatus 151. With this arrangement, it is possible to specify an arbitrary connection target communication apparatus 151 by the specific user operation for the connection target communication apparatus 151. Therefore, the user need not recognize in advance the identification information uniquely determined for an individual product, which is a complex character string, thereby improving convenience.

Second Embodiment

The second embodiment will be described concerning points different from the first embodiment. In the first embodiment, after the information processing apparatus 101 detects the beacon including the temporary connection SSID, a notification is made to prompt the user to perform the specification operation on the communication apparatus 151. If the specification operation is performed, the temporary connection SSID is changed, and the connection target communication apparatus 151 is specified by the changed temporary connection SSID. This embodiment will describe an arrangement in which if an information processing apparatus 101 detects that the SSID of a communication apparatus 151 (to be referred to as a communication apparatus 500) which is not a connection target includes an operation information character string of a specification operation, a notification is made to prompt the user to perform a different specification operation on a connection target communication apparatus 151, and the connection target communication apparatus 151 is specified. This embodiment will be described below with reference to FIGS. 3A, 3C, 3D, and 5.

Figure 5A:
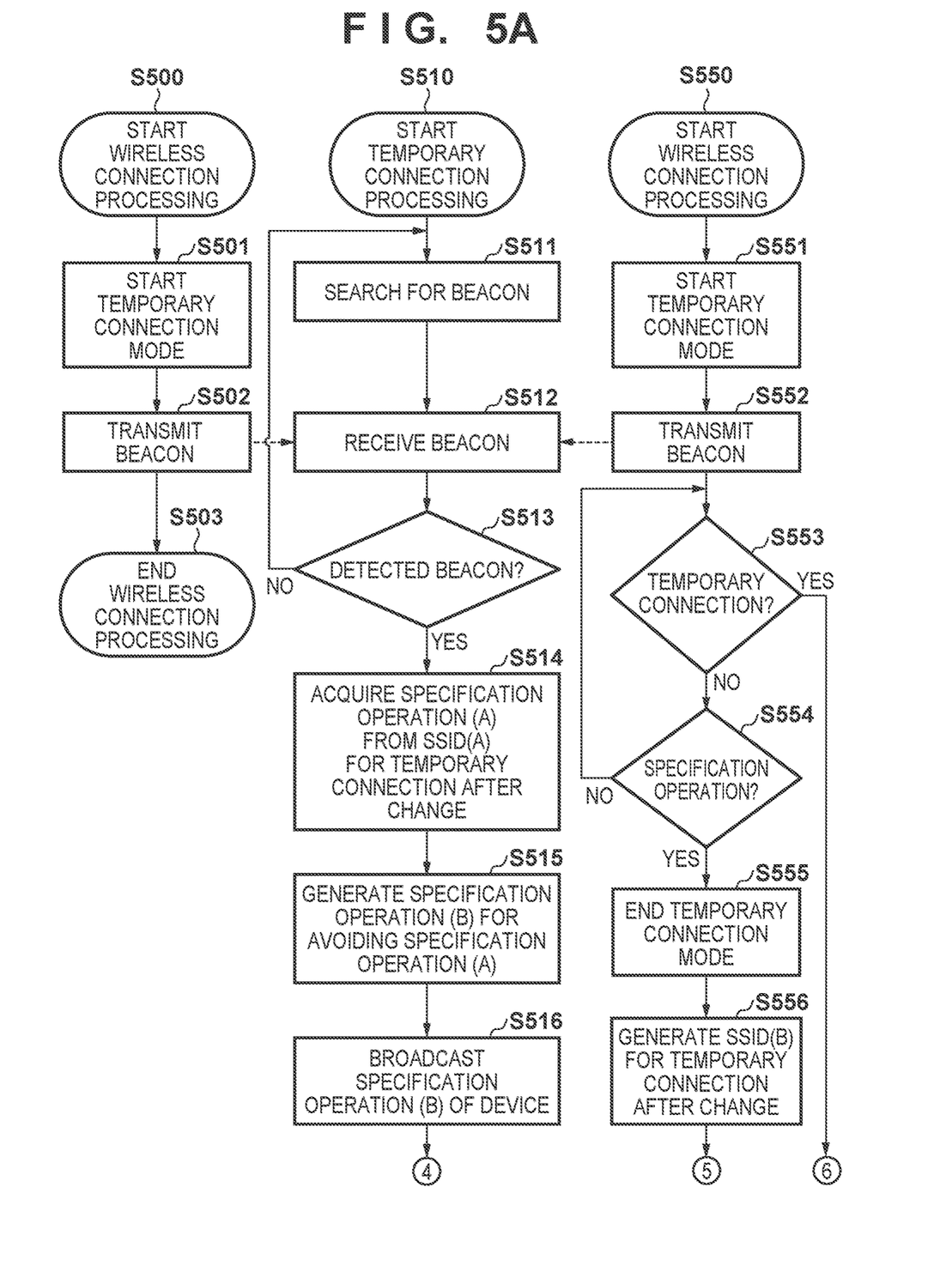
FIGS. 5A to 5B are flowcharts illustrating processes executed by an information processing apparatus and a communication apparatus.
Figure 5B:
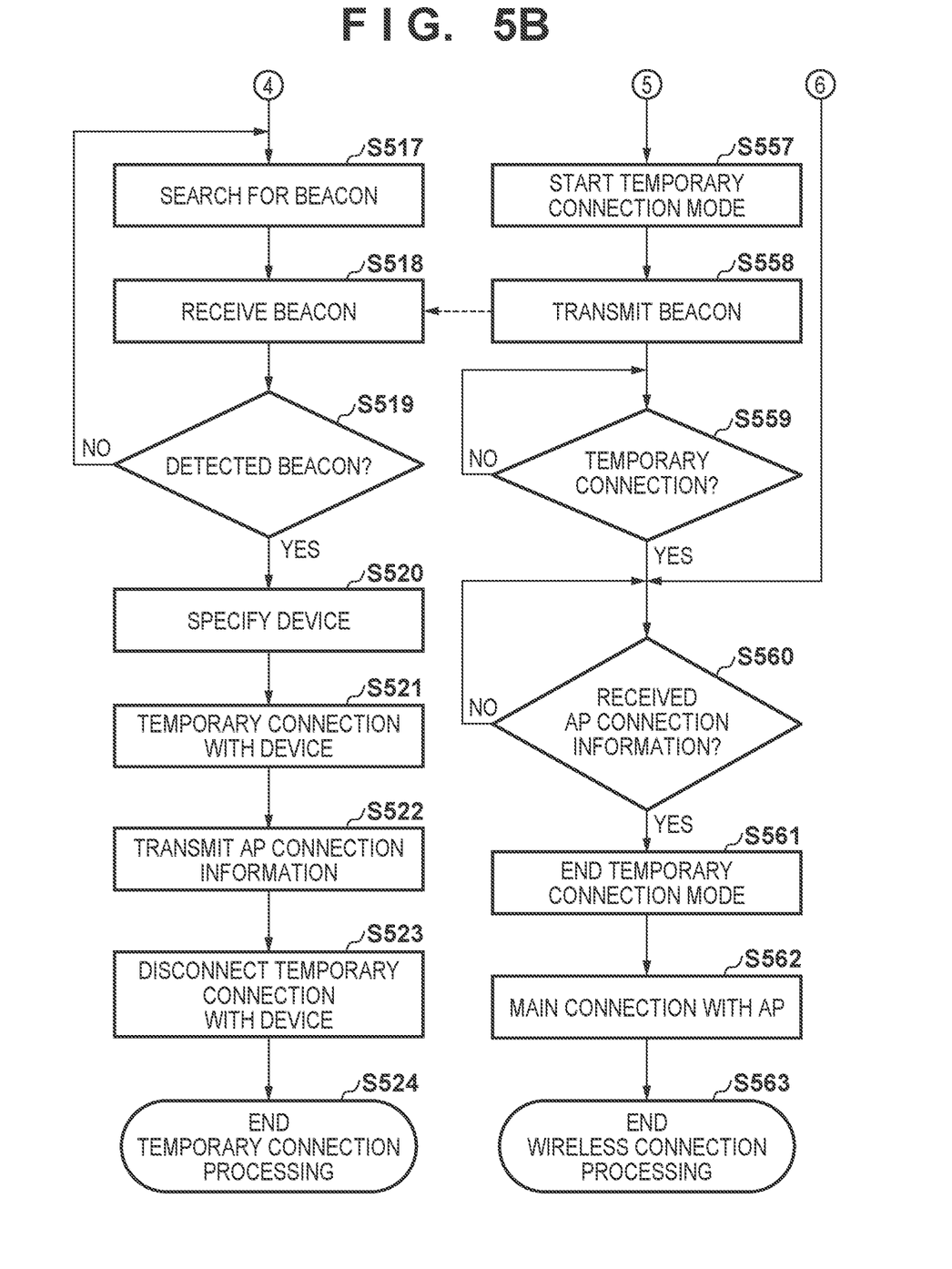

FIGS. 5A to 5B are flowcharts illustrating processing executed by the information processing apparatus 101 to specify the connection target communication apparatus 151 according to this embodiment. With the processing shown in FIGS. 5A to 5B, if it is detected that the SSID of the communication apparatus 500 which is not a connection target includes an operation information character string of a specification operation, a notification is made to prompt the user to perform a different specification operation on the connection target communication apparatus 151, and the connection target communication apparatus 151 is specified. The processing of the information processing apparatus 101 in FIGS. 5A to 5B is implemented when, for example, a CPU 103 reads out a program stored in a ROM 104 and executes it. The processing of the communication apparatus 151 in FIGS. 5A to 5B is implemented when, for example, a CPU 154 reads out a program stored in a ROM 152 and executes it.

This embodiment assumes that the communication apparatus 500 has executed the processes in steps S450 to S456 of FIGS. 4A to 4B. The communication apparatus 500 starts a temporary connection mode (step S501), and transmits a beacon including a changed temporary connection SSID to the periphery (step S502). Steps S501 and S502 correspond to steps S457 and S458 of FIGS. 4A to 4B. In this embodiment, the communication apparatus 500 does not change from the state in which the temporary connection mode starts, and thus the processing of the communication apparatus 500 ends (step S503).

On the other hand, in the information processing apparatus 101, if a setup application starts a setup for the communication apparatus 151 to be connected to an access point 131, the processing of the information processing apparatus 101 in FIGS. 5A to 5B is started (step S510). After the processing is started, the information processing apparatus 101 searches for a beacon (step S511), and receives a beacon transmitted on the periphery of the information processing apparatus 101 (step S512).

On the other hand, in the communication apparatus 151, the processing of the communication apparatus 151 in FIGS. 5A to 5B is started by performing a predetermined operation of causing the communication apparatus 151 to operate as an access point (step S550). The predetermined operation of causing the communication apparatus 151 to operate as an access point is, for example, a predetermined operation of causing the above-described communication apparatus 151 to operate in a network setup mode.

Upon accepting the predetermined operation, the communication apparatus 151 is set in the temporary connection mode for temporary connection (step S551), and transmits a beacon indicating the temporary connection SSID to the periphery (step S552). After that, the communication apparatus 151 determines whether it is connected to one information processing apparatus 101 in the temporary connection mode (step S553).

If it is determined in step S553 that the communication apparatus 151 is connected to one information processing apparatus 101, the communication apparatus 151 stands by for reception of connection information of the access point 131 to be connected to the access point 131 (step S560). On the other hand, if it is determined in step S553 that the communication apparatus 151 is not connected to any information processing apparatus 101, the communication apparatus 151 stands by for acceptance of the specification operation (step S554). In step S554, if a predetermined time elapses according to a timer, it is determined that no specification operation is performed.

On the other hand, the information processing apparatus 101 determines, based on the SSID included in the beacon received in steps S511 and S512, whether the beacon including the changed temporary connection SSID and the beacon including the temporary connection S SID are detected (step S513). If it is determined in step S513 that the beacon including the changed temporary connection SSID and the beacon including the temporary connection SSID are not detected, the processing is repeated from step S511.

Assume here that the information processing apparatus 101 receives the beacon including the changed temporary connection SSID of the communication apparatus 500 and the beacon including the temporary connection SSID of the communication apparatus 151. In this case, it is determined in step S513 that the beacon including the changed temporary connection SSID and the beacon including the temporary connection SSID are detected. The information processing apparatus 101 acquires the operation information character string of the specification operation included in the changed temporary connection SSID (step S514). The changed temporary connection SSID acquired from the communication apparatus 500 is set as a changed temporary connection SSID (A). If, for example, the changed temporary connection SSID (A) is "WifiSetup-DeviceName-12345-B3", the information processing apparatus 101 acquires "-B3" as the operation information character string of the specification operation. Then, the information processing apparatus 101 determines the specification operation from the operation information character string of the specification operation. Then, the information processing apparatus 101 designates a specification operation of avoiding the determined specification operation (step S515). Assume, for example, that the operation information character string of the specification operation acquired by the information processing apparatus 101 is "-B3". Assume also that the information processing apparatus 101 stores "-B" as the operation information character string of "the pressing of the button", and "the number of times of the pressing" as a subsequent numeric string. In this case, the information processing apparatus 101 determines "-B3" as the specification operation of "three times of the pressing of the button". The information processing apparatus 101 designates a specification operation of "four times of the pressing of the button" for avoiding the specification operation of "three times of the pressing of the button". That is, in step S515, a specification operation that designates contents different from those of the specification operation acquired in step S514 is designated. The information processing apparatus 101 notifies the user to perform the specification operation, designated in step S515, for the connection target communication apparatus 151 (step S516). In step S516, the information processing apparatus 101 displays, on a display unit 108, a notification screen 310 shown in FIG. 3A. If the user presses a "next" button 313 on the notification screen 310, the information processing apparatus 101 displays, on the display unit 108, a search screen 330 shown in FIG. 3C.

On the other hand, in the communication apparatus 151, if it is determined in step S554 that the specification operation is performed, the communication apparatus 151 ends the temporary connection mode (step S555). In step S555, for example, the communication apparatus 151 stops transmission of the beacon signal. Then, the communication apparatus 151 generates a changed temporary connection SSID (step S556). The changed temporary connection SSID generated by the communication apparatus 151 is set as a changed temporary connection SSID (B).

After the changed temporary connection SSID is generated, the communication apparatus 151 is set again in the temporary connection mode (step S557), and transmits a beacon indicating the changed temporary connection SSID (B) generated in step S556 to the periphery (step S558). The communication apparatus 151 determines whether it is connected to one information processing apparatus 101 in the temporary connection mode (step S559). The processing in step S559 is repeated until it is determined that the communication apparatus 151 is connected to one information processing apparatus 101.

On the other hand, the information processing apparatus 101 displays the search screen 330 on the display unit 108 to search for a beacon (step S517), and receives a beacon transmitted on the periphery of the information processing apparatus 101 (step S518). Based on the SSID received in step S518, the information processing apparatus 101 determines whether the beacon including the changed temporary connection SSID (B) is detected (step S519). Since the received SSID is formed by character strings of a character string for a Wi-Fi setup, a product name character string, an identification information character string uniquely determined for an individual product, and the operation information character string of the specification operation, the information processing apparatus 101 determines that the changed temporary connection SSID (B) is detected. If it is determined in step S519 that the beacon including the changed temporary connection SSID (B) is not detected, the processing is repeated from step S517. On the other hand, if it is determined in step S519 that the beacon including the changed temporary connection SSID (B) is detected, the information processing apparatus 101 specifies, as the connection target communication apparatus 151, the communication apparatus 151 that transmits the beacon including the changed temporary connection SSID (B) (step S520). In step S520, the information processing apparatus 101 displays, on the display unit 108, a result screen 340 shown in FIG. 3D. The result screen 340 includes a device information character string 341 as a character string for identifying the specified communication apparatus 151. If the user presses a "next" button 342 on the result screen 340, the information processing apparatus 101 is connected to the communication apparatus 151 using the changed temporary connection SSID (B) transmitted by the communication apparatus 151 (step S521). In step S521, for example, a network setup request by DPP is transmitted to the communication apparatus 151. The information processing apparatus 101 transmits the connection information of the access point 131 to the connected communication apparatus 151 (step S522), and then disconnects the connection from the communication apparatus 151 (step S523). After step S523, the processing of the information processing apparatus 101 ends (step S524).

On the other hand, in the communication apparatus 151, if it is determined in step S559 that the communication apparatus 151 is connected to one information processing apparatus 101, the communication apparatus 151 stands by for reception of the connection information of the access point 131 to be connected to the access point 131 (step S560). The processing in step S560 is repeated until the connection information of the access point 131 is received. After receiving the connection information of the access point 131 from the connected information processing apparatus 101 in step S560, the communication apparatus 151 ends the temporary connection mode (step S561). Then, the communication apparatus 151 is connected to the access point 131 using the received connection information of the access point 131 (step S562). After step S562, the processing of the communication apparatus 151 ends (step S563).

As described above, in this embodiment, even if there exist a plurality of communication apparatuses and a specification operation has already been performed for a communication apparatus which is not a connection target, the user is notified to perform a different specification operation on a connection target communication apparatus. This arrangement can prevent a situation in which a connection target communication apparatus cannot be specified depending on the state of the SSID included in the beacon transmitted by the peripheral communication apparatus. Therefore, the user need not recognize the SSID of the peripheral communication apparatus and the state of the communication apparatus, thereby making it possible to improve convenience.

Note that the form in which the signal including the SSID is the beacon based on the IEEE802.11 series and communication between the information processing apparatus and the communication apparatus is executed based on the IEEE802.11 series has been described above but the present invention is not limited to this. For example, the signal including the SSID may be a signal based on Bluetooth Classic, Bluetooth Low Energy, or Wi-Fi Aware. In addition, communication between the information processing apparatus and the communication apparatus may be executed based on Bluetooth Classic, Bluetooth Low Energy, or Wi-Fi Aware.

Furthermore, the form in which as communication between the information processing apparatus and the communication apparatus, the connection information of the access point 131 is communicated and the communication apparatus is connected to the access point using the connection information has been described above but the present invention is not limited to this. For example, as communication between the information processing apparatus and the communication apparatus, connection information for performing, without intervention of an external access point, direct connection to the communication apparatus in a direct communication mode different from the temporary connection mode may be communicated. Then, the information processing apparatus may directly be connected to the communication apparatus using the connection information. Note that since the connection information includes a password that can arbitrarily be changed by the user by an operation for the communication apparatus, direct connection to the communication apparatus in the direct communication mode is more secure than direct connection to the communication apparatus in the temporary connection mode. Furthermore, communication between the information processing apparatus and the communication apparatus is not limited to communication for performing connection setting of the communication apparatus, and may be, for example, communication for transmitting a print job to the communication apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-050453, filed Mar. 25, 2022, which is hereby incorporated by reference herein in its entirety.

What is claimed is:

1. A method executed by an information processing apparatus, the method comprising:
   detecting a signal transmitted from an external communication apparatus; and
   displaying, based on the detected signal, information of the communication apparatus corresponding to the signal on a display unit of the information processing apparatus,
   wherein if a first signal is detected, a notification screen for prompting a user to perform a specification operation on the communication apparatus is displayed on the display unit,
   if a second signal is detected after displaying the notification screen on the display unit, in a case in which the second signal corresponds to the specification operation, information of the communication apparatus corresponding to the second signal is displayed on the display unit,
   if the first signal is detected and the second signal is also detected, a second notification screen for prompting the user to perform a second specification operation different from the specification operation on the communication apparatus is displayed on the display unit, and
   if a third signal is detected after displaying the second notification screen on the display unit, in a case in which the third signal corresponds to the second specification operation, information of the communication apparatus corresponding to the third signal is displayed on the display unit.

2. The method according to claim 1, wherein
   it is determined whether the second signal corresponds to the specification operation, and
   if it is determined that the second signal corresponds to the specification operation, the information of the communication apparatus corresponding to the second signal is displayed on the display unit.

3. The method according to claim 1, wherein
   in response to an instruction from the user, connection to the communication apparatus corresponding to the second signal is established, and
   if the connection is established, information of an access point different from the information processing apparatus and the communication apparatus is transmitted to the communication apparatus.

4. The method according to claim 1, wherein the second signal includes information representing the specification operation.

5. The method according to claim 4, wherein the information corresponding to the specification operation is stored.

6. The method according to claim 4, wherein the second signal is a signal obtained by adding the information corresponding to the specification operation to information included in the first signal.

7. The method according to claim 1, wherein the communication apparatus is a printer.

8. The method according to claim 1, wherein the specification operation includes at least one of pressing of a button provided in the communication apparatus, opening/closing of a tray, and feeding of paper to the tray.

9. A non-transitory computer-readable storage medium storing a program configured to cause a computer to function to:
   detect a signal transmitted from an external communication apparatus; and
   display, based on the detected signal, information of the communication apparatus corresponding to the signal on a display unit of an information processing apparatus,
   wherein if a first signal is detected, a notification screen for prompting a user to perform a specification operation on the communication apparatus is displayed on the display unit, and
   if a second signal is detected after displaying the notification screen on the display unit, in a case in which the second signal corresponds to the specification operation, information of the communication apparatus corresponding to the second signal is displayed on the display unit,
   if the first signal is detected and the second signal is also detected, a second notification screen for prompting the user to perform a second specification operation different from the specification operation on the communication apparatus is displayed on the display unit, and
   if a third signal is detected after displaying the second notification screen on the display unit, in a case in which the third signal corresponds to the second specification operation, information of the communication apparatus corresponding to the third signal is displayed on the display unit.

10. An information processing apparatus, comprising:
    at least one processor with a memory comprising instructions, when executed by the processor, causing the processor to:
    detect a signal transmitted from an external communication apparatus; and
    display, based on the detected signal, information of the communication apparatus corresponding to the signal on a display unit of the information processing apparatus,
    wherein if a first signal is detected, a notification screen for prompting a user to perform a specification operation on the communication apparatus is displayed on the display unit,
    if a second signal is detected after displaying the notification screen on the display unit, in a case in which the second signal corresponds to the specification operation, information of the communication apparatus corresponding to the second signal is displayed on the display unit,
    if the first signal is detected and the second signal is also detected, a second notification screen for prompting the user to perform a second specification operation different from the specification operation on the communication apparatus is displayed on the display unit, and
    if a third signal is detected after displaying the second notification screen on the display unit, in a case in which the third signal corresponds to the second specification operation, information of the communication apparatus corresponding to the third signal is displayed on the display unit.

* * * * *